United States Patent
Lindenstruth et al.

(10) Patent No.: US 7,386,757 B2
(45) Date of Patent: Jun. 10, 2008

(54) METHOD AND APPARATUS FOR ENABLING HIGH-RELIABILITY STORAGE OF DISTRIBUTED DATA ON A PLURALITY OF INDEPENDENT STORAGE DEVICES

(75) Inventors: Volker Lindenstruth, Heidelberg (DE); Arne Wiebalck, Heidelberg (DE)

(73) Assignee: Certon Systems GmbH, Heidelberg (DE)

( * ) Notice: Subject to any disclaimer, the term of this patent is extended or adjusted under 35 U.S.C. 154(b) by 512 days.

(21) Appl. No.: 10/977,725

(22) Filed: Oct. 29, 2004

(65) Prior Publication Data

US 2005/0102548 A1    May 12, 2005

(30) Foreign Application Priority Data

Oct. 30, 2003    (DE) ................. 103 50 590

(51) Int. Cl.
G06F 11/00    (2006.01)
(52) U.S. Cl. ............................. 714/6; 714/7
(58) Field of Classification Search .............. 714/6, 714/5, 7, 8, 1
See application file for complete search history.

(56) References Cited

U.S. PATENT DOCUMENTS

| | | | |
|---|---|---|---|
| 5,271,012 A * | 12/1993 | Blaum et al. ................. | 714/6 |
| 6,353,895 B1 | 3/2002 | Stephenson | |
| 7,200,770 B2 * | 4/2007 | Hartwell et al. .............. | 714/7 |
| 2002/0048284 A1 | 4/2002 | Moulton | |
| 2003/0046497 A1 * | 3/2003 | Dandrea ..................... | 711/154 |
| 2003/0084397 A1 | 5/2003 | Peleg | |
| 2003/0237019 A1 * | 12/2003 | Kleiman et al. .............. | 714/6 |

FOREIGN PATENT DOCUMENTS

JP    110 25 022 A    1/1999

OTHER PUBLICATIONS

Patterson, David A., et al., A Case for redundant Arays of Inexpensive Disks (RAID), Sigmond Int'l Conf. on Data Management, Chicago, IL, 1988, pp. 109-116.
Stonebreaaker, Michael, et al., Distributed RAID- A New Multiple Copy Algorithm, Proc. Int'l Conf. on Data Engineering, Univ. of California, Berkeley, 1990, pp. 430-437.
Hwang, Kai, et al., Orthogonal Striping and Mirroring in Distributed RAID for I/O-Centric Cluster Computing, IEEE Trans. on Paral. & Distr. Sys, vol. 13, No. 1, 26-44, 2002.

* cited by examiner

Primary Examiner—Dieu-Minh Le
(74) Attorney, Agent, or Firm—Barry N. Young

(57) ABSTRACT

A cluster computer system and method for distributed data storage enables distributed, reliable, low overhead mass storage systems. In particular, the system and method contemplate a plurality of computers connected in a network, each computer comprising a node having mass storage devices providing storage areas for data and redundancy information. Computer nodes access their locally attached mass storage devices independently and asynchronously, with a minimum of network transactions and storage overhead. The information stored on the mass storage devices is highly reliable due to the distribution of redundant information within the computer cluster. Redundancy information is used to reconstruct data associated with storage area access failures.

17 Claims, 5 Drawing Sheets

METHOD AND APPARATUS FOR ENABLING HIGH-RELIABILITY STORAGE OF DISTRIBUTED DATA ON A PLURALITY OF INDEPENDENT STORAGE DEVICES

BACKGROUND OF THE INVENTION

Large scale mass storage systems are driven by many emerging applications in research and industry. For instance particle physics experiments generate petabytes of data per annum. Many commercial applications, for instance digital video or medical imaging, require highly reliable, distributed mass storage for on-line parallel access. Mass storage systems of petabyte scale have to be built in a modular fashion as no single computer can deliver such scalability.

Large farms of standard PCs have become a commodity and replace traditional supercomputers due to their comparable compute power and their much lower prices. The maximum capacity of standard disk drives, such as installed in commodity PCs, exceeds 1 terabyte per node. Thus, a cluster installation with 1000 commodity PCs and disks would provide a distributed mass storage capacity, exceeding 1 petabyte at a minimal cost. The reason why this type of distributed mass storage paradigm has not been adopted yet is its inherent unreliability.

Local disks, connected to a central server, can be protected against data loss by using RAID technology (RAID: "Redundant Array of Independent/Inexpensive Disks"). Proposed by Patterson et al. (D. A. Patterson, G. Gibson, and R. H. Katz: "A Case for Redundant Arrays of Inexpensive Disks", SIGMOD International Conference on Data Management, Chicago, pp. 109-116, 1988), RAID aims at improving performance and reliability of single large disks by assembling them into one virtual device, while maintaining distributed parity information within this device. The cited paper introduces five RAID strategies, often quoted as RAID levels 1 through 5, which differ in terms of performance and reliability. In addition to these five levels, the RAID Advisory Board defined four more levels, referred to as levels 0, 6, 10 and 53. All these RAID schemes are defined for local disk arrays. They are widely used in order to enhance the data rate or to protect from data loss by a disk failure, within one RAID ensemble.

A next step was to apply the RAID concept to a distributed computer farm. Distributed RAID on a block level (as opposed to a file system level) as first proposed by Stonebraker and Schloss (M. Stonebraker and G. A. Schloss: Distributed RAID—A new Multicopy Algorithm, Proceedings of the International Conference on Data Engineering, pp. 430-437, 1990) and patented, for instance, in JP 110 25 022 A. This approach suffers often from several drawbacks: reliability, space overhead, computational overhead and network load. Most of these systems can only tolerate a single disk failure. Simple calculations show however, that inevitably larger systems must be able to cope with simultaneous errors of multiple components. This applies, in particular, to clusters of commodity components such as mentioned above, since the quality of standard components may be worse than that of high-end products. However, given the potential scale of the discussed systems, no compute node is reliable enough to provide appropriate reliability to support scalability to thousands of nodes. In addition, the space overhead, defined as the ratio of space required for redundant data to the space available for user data, induced by these systems is in most cases not optimal with respect to the Singleton bound (D. R. Hankerson: Coding Theory and Cryptography: The essentials, ISBN: 0824704657). Codes that attain this bound are able to tolerate a disk failure for every redundancy region that is available within the system. It can be easily shown that as the minimal requirement for tolerating N disk failures, N redundancy regions are required. Distributed data mirroring, as for instance proposed by Hwang et al. (K. Hwang, H. Jin, and R. Ho: Orthogonal Striping and Mirroring in Distributed RAID for I/O-centric Cluster Computing, IEEE Transactions on Parallel and Distributed Systems, Vol. 13, no. 1, January 2002), is very inefficient, using only half of the total capacity for user data. In addition, the whole system can only tolerate a single disk error. For larger installations, the probability of a data loss scales linear with the system size, approaching 1 during a period of a few years for the named systems, even if highly reliable components are being used.

All these system have in common that they stripe logical data objects over several physical devices. For instance, logically adjacent blocks of a file are distributed over several disks in case of a distributed system on multiple nodes. For distributed systems, this distribution of data blocks has a major drawback. It requires network transactions for any read/write access to the said logical data object. For example, in case of a read access to a large file on an N-node distributed RAID system, the fraction 1-1/(N-P) of all read accesses have to be performed across the network from remote nodes, where P is the number of redundancy blocks in a stripe group (usually 1). This traffic increases both network and CPU overhead.

Other distributed systems use network-capable RAID controllers (e.g., N. Peleg: Apparatus and Method for a Distributed RAID, U.S. patent application Ser. No. 2003/0084397) or are meant for use in wide area networks (e.g., G. H. Moulton: System and Method for Data Protection with Multidimensional Parity, U.S. patent application Ser. No. 2002/0048284). Data striping also applies to systems that are able to tolerate multiple failures by using multidimensional parity (e.g., D. J. Stephenson: RAID architecture with two-drive fault-tolerance, U.S. Pat. No. 6,353,895).

PC clusters traditionally have centralized file servers and use the known RAID technology for their local devices. In addition, backup systems are provided to protect from data loss in the case of an unrecoverable server error. However, such backup systems may require substantial time for the recovery process. It is desirable to avoid the expensive installations of centralized file servers with their associated disadvantages of poor scalability, low network throughput and high cost by building a reliable mass storage system based on the unreliable components of the cluster.

SUMMARY OF THE INVENTION

The present invention is embodied in a cluster computer system providing scalable, highly reliable data storage on multiple distributed, independent storage devices, with adjustable fault tolerance and corresponding overhead and minimal network communication requirements. It enables independent and asynchronous read/write access of all nodes in the computer cluster to local mass storage devices without particular knowledge of the cluster. The invention provides fault tolerance with respect to the partial or the complete loss of a node and its storage devices, by affording a method and apparatus for reconstructing the lost data on a spare node based on available redundancy information distributed in the cluster.

Read accesses of the computer nodes in the cluster to their local mass storage devices may be serviced directly by a read-write module for user data by forwarding the access requests to an underlying physical mass storage device without the necessity for interaction with any other node in the cluster, unless the read returned an error. Local read error detection, such as may be accomplished, for instance, by verifying a Cyclic Redundancy Check CRC that may be automatically attached to any data block, may be employed by the mass storage devices. This enables device failures and data transmission errors to be easily detected by a node itself.

Write transactions of a node to a local mass storage device may be intercepted by the read-write module for user data and the appropriate redundancy information may be computed and distributed appropriately in the cluster prior to writing the data block to the local mass storage. This redundancy information may be used to restore data in the case of a device failure. The approach of the invention to serve read requests from the local device and to only update remote redundancy information for write requests is fundamentally different from other distributed RAID systems. During normal operation, the architecture of the invention allows for a reduction of the network load to a minimum and imposes minimal additional load on the processor for read requests as compared to a stand-alone computer. A desired level of fault tolerance and data security can be freely chosen by defining the number of redundancy blocks per group of data blocks in an ensemble, allowing optimization of the redundancy data overhead while maintaining a very high reliability.

The invention affords an efficient and reliable storage system based upon unreliable components. Simple considerations show that a cluster with about 1000 PCs, each equipped with a 1 terabyte disk storage, can easily be incorporated into a distributed mass storage system with a capacity of about 1 petabyte and a mean time to data loss by disk failure of several 10,000 years. Among typical applications of such systems are research institutes operating PC farms with a high demand for reliable data storage (for instance genome databases or high energy physics experiments), TV and radio stations for storage of digitized multimedia data, or service providers like the internet search engines and the like. The present inventive architecture is useful and advantageous for these and other applications requiring highly-reliable mass storage.

DETAILED DESCRIPTION OF THE PREFERRED EMBODIMENTS

Figure 1:
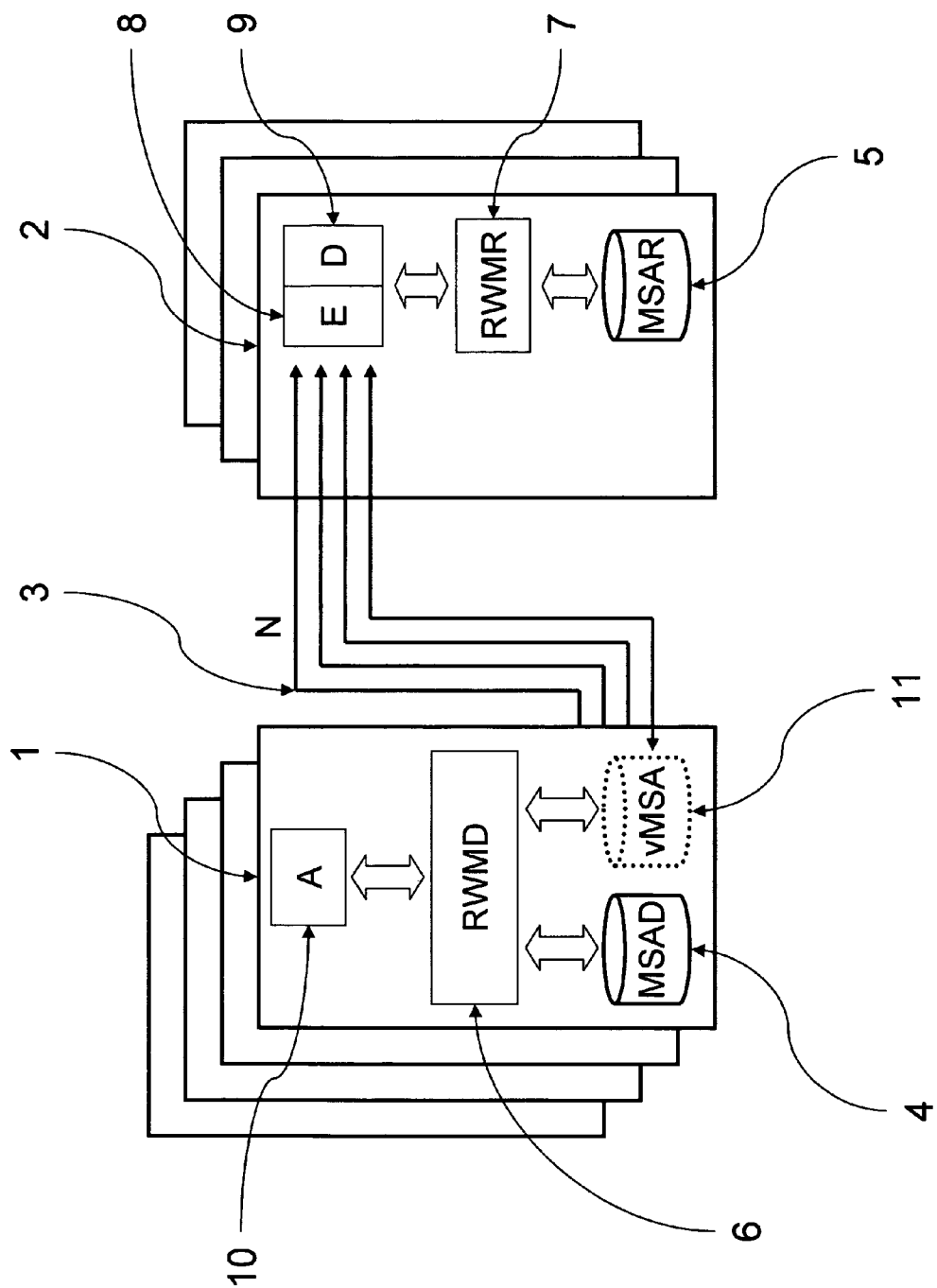
FIG. 1 depicts schematically the functional architecture of an embodiment of a cluster computer system in accordance with the invention.

FIG. 1 shows schematically the simplified functional architecture of a preferred embodiment of a distributed storage cluster computer system in accordance with the invention. As shown, the system may comprise a plurality of nodes (1), each embodying a mass storage area for user data (MSAD) (4) and a plurality of nodes (2), each embodying a mass storage area for redundancy data (MSAR) (5). Each node (1, 2) may be an independent computer having one or more associated data storage devices that provide one or more of the mass storage areas. The system has at least one mass storage area of each kind. In the preferred embodiment, the mass storage areas for user data and those for redundancy information may be assigned to dedicated nodes, or nodes may implement both functionalities.

All nodes in the system are connected by a network (3). All nodes contain at least one mass storage area MSAD, MSAR (4,5) which is part of the system. All storage areas are block-oriented. They are subdivided into blocks, which are preferably of equal size. The individual mass storage areas may be distributed over one or several block devices on one node supporting the same block size. Access to a block device is only possible in multiples of a block. Hard disks, floppies, or CDROMs are examples for such block-oriented devices which may be employed. In this sense, also a node's main memory is block oriented, since the access is byte-wise. All nodes contain read-write modules, either for user data, RWMD (6) or redundancy information RWMR (7), or both. The data path also may contain a redundancy encoder, E (8), which generates redundancy information for write requests, and a redundancy decoder, D (9), which decodes the original user data if the local disk is not operational. The redundancy encoder and decoder, which may be embodied in a single unit and are referred to herein as CODECs or redundancy modules, (8,9) can reside on any node.

The set of blocks on storage devices is divided into the two groups of logical mass storage areas (data and redundancy). There is preferably a well-defined mapping between all data and redundancy blocks in the various mass storage areas. A redundancy block stores the redundancy information of all data blocks that are associated to it. A set of associated data and redundancy blocks is defined herein as a redundant block ensemble. No two blocks within one redundant block ensemble may reside on the same node. Therefore, although a node may embody user data and redundancy areas, within a given redundant block ensemble a node serves exclusively either as a data node (1), holding a data block, or as a redundancy node (2) holding a redundancy block. They will be referenced as such in the description below.

Each access to the storage devices (4,5) may be intercepted by the appropriate read-write modules (6,7). In case of a read access, an unchanged read request is forwarded to the underlying local device and the result of the operation is sent back to the requesting application, A (10). The interception is necessary to check if the transaction succeeded or failed. The ability to determine the completion status of an operation is a required feature of the underlying device. In case of a read error, the read-write module (6) will reconstruct the data and forward it to the application (10). In the case of a write access, the transaction is also intercepted by the read-write-modules (6). However, before the actual data is written to the local device, the difference between the old and new data is computed by first reading the old data blocks and comparing the old data with the new data. The redundancy encoder (8) uses this difference as its input to calculate any changes to be made on the corresponding redundancy blocks. For example, this difference can be calculated by applying a logical exclusive-OR ("XOR") operation to the two data sets. The difference data is sent over the network (3) to all nodes holding redundancy blocks of the given redundant block ensemble.

In order to provide a simple interface for the network transfer of this differential data, the remote storage may be made visible on the local machine using virtual mass storage areas, vMSA (11). A virtual storage area masquerades a remote storage area as being local. Thus, the remote area does not differ from any other access to a local device from the read-write modules point of view. However, all read-write requests from a virtual device are served from the appropriate remote device.

The computed difference between stored data and the pending write transaction is used as the basis for the calculation of updated redundancy information using the redundancy encoder (8). The error-correcting encoder returns the difference between the old and the new redundancy data. Therefore, the result cannot simply be written to the corresponding redundancy block in the redundancy mass storage area (5), but has to be added to the existing redundancy information, making this access a read-modify-write block transaction, also. One example of an appropriate error-correcting code is Reed-Solomon Codes (I. S. Reed and G. Solomon: Polynomial codes over certain finite fields, Journal of the Society of Applied Mathematics, 8:300-304, 1960). However, other error correcting codes can also be used in the invention.

The position of the encoder in the data path may be flexible and arbitrary. It is not necessary to compute the redundancy information on the redundancy node (2) holding the redundancy block. It is possible to determine the change in the redundancy information on the data node (1) and to send the difference in the redundancy information to the redundancy node (2). For better load balancing, it is therefore possible to install an appropriate redundancy encoder on or otherwise associate an appropriate redundancy encoder with every node in the system. Depending on the complexity of the redundancy algorithm used, and in order to off-load operations from the host CPU, a hardware-supported CODEC can be instantiated to accelerate and improve the overall system performance. FPGA (field programmable gate array) technology is a suitable candidate for such a hardware-supported implementation. All operations needed, in particular for the above-mentioned XOR operation, can easily be implemented in massively parallel hardware. The location independence of the CODEC is advantageous in allowing only a few nodes in the system to be provided with such a hardware accelerator, if desired, while providing various trade-offs between cost and performance.

Figure 2:
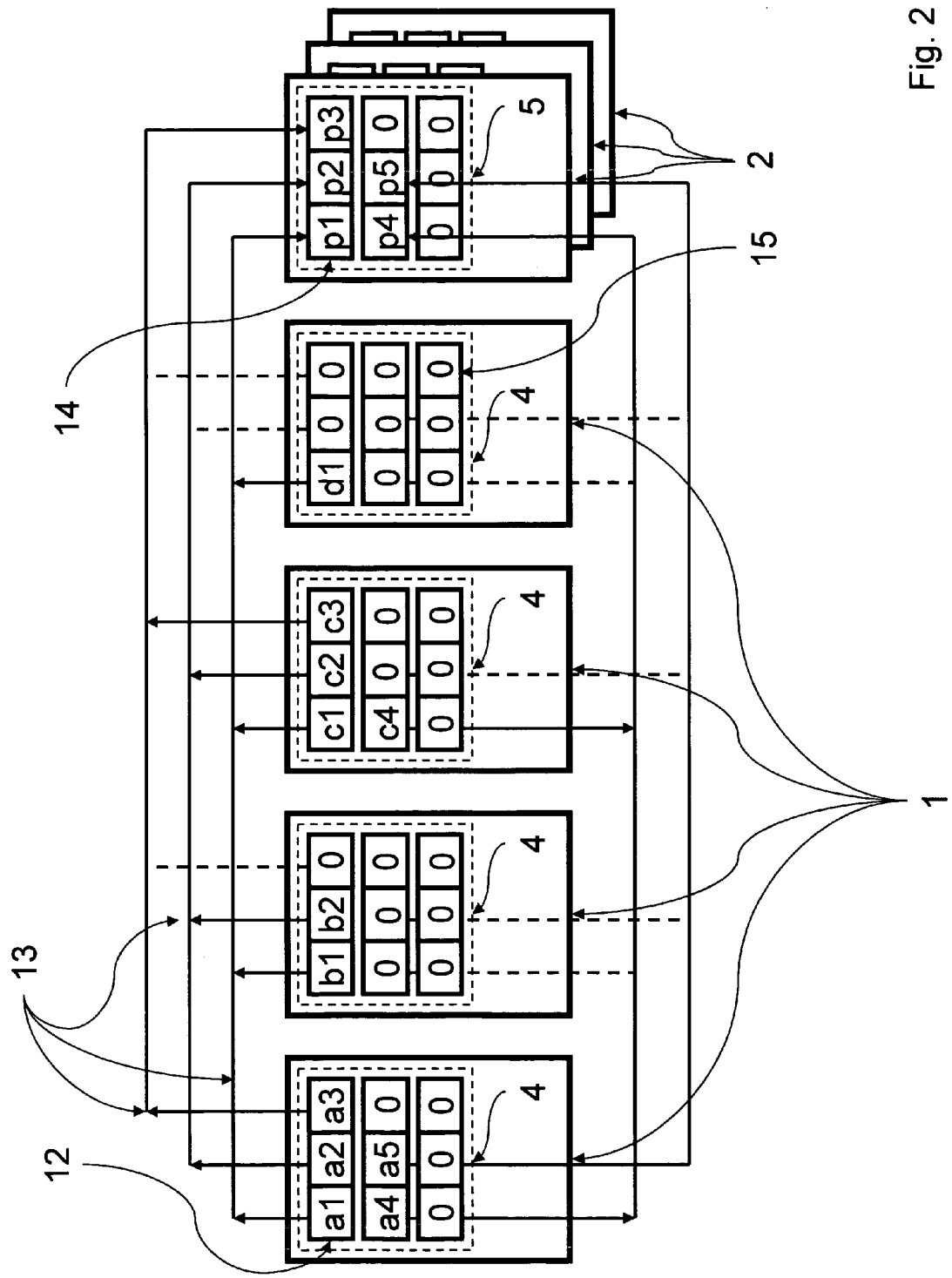
FIG. 2 shows a first embodiment of the physical distribution of data and redundancy blocks in the system where some nodes only store data, while others only store redundancy information.

FIG. 2 is an embodiment that shows an example of the distribution of blocks with dedicated data nodes (1) and redundancy nodes (2). In this example, every node in the cluster system embodies exclusively either an MSAD (4) or MSAR (5) and, therefore, serves exclusively as a computer with data mass storage entity (1) or a computer with redundancy mass storage entity (2). In this example, the blocks ai, bi, ci, di and pi form a redundant blocks ensemble (13), where i is an index uniquely identifying the ensemble, a, b, c, d are data blocks, and p is a checksum block, in this case parity. In order to start the system in a defined state with correct redundancy information, the unused blocks (15) may be initialized to a defined value, such as 0 as indicated in the figure.

The data can be read from the local devices independently and asynchronously with respect to all other nodes in the system. For write accesses, however, the steps as described above are followed. For instance, writing to data block a1 (12) triggers the computation of redundancy information (12) which is added to the information on the associated (13) redundancy block p1 (14). In addition, all associated redundancy blocks on all other nodes (2), embodying MSAR (5), are also updated. The redundancy information in block p1 and all other redundancy blocks in the redundancy blocks ensemble may be calculated from the data in the data blocks a1, b1, c1, and d1.

The assignment of blocks to logical structures, such as files, is entirely independent from the assignment of blocks to redundant blocks ensembles. For instance, the blocks a1 through a5 in FIG. 2 could contain the data of a file on an associated node, thus requiring five data blocks for the nodes shown. In the preferred embodiment of the invention, all logical data objects (file system, files and the like) of one node may be stored within the data mass storage area (4) of that given node, the data storage therefore remaining completely local while being redundantly encoded remotely due to the existence of the remote redundancy mass storage areas (5). Consequently, read accesses will remain completely local and independent. Only in the case of read errors would the system have to access the remote storage areas (data (4) and redundancy (5)) in order to reconstruct the lost information. In prior art RAID systems, the blocks would have been distributed over all devices so that the (logically adjacent) blocks a1 through a5, and thus the contents of the file they describe, would not reside on a single device. Read access to the data would, therefore, necessarily induce network transactions in any case to all associated data mass storage areas in the system.

In the example shown in FIG. 2, some nodes have exclusively redundancy mass storage areas connected and cannot be used for user data. Those nodes do not have locally attached redundant mass storage for user data, and are, therefore, less useful for application processing as all related mass storage accesses are remote.

Figure 3:
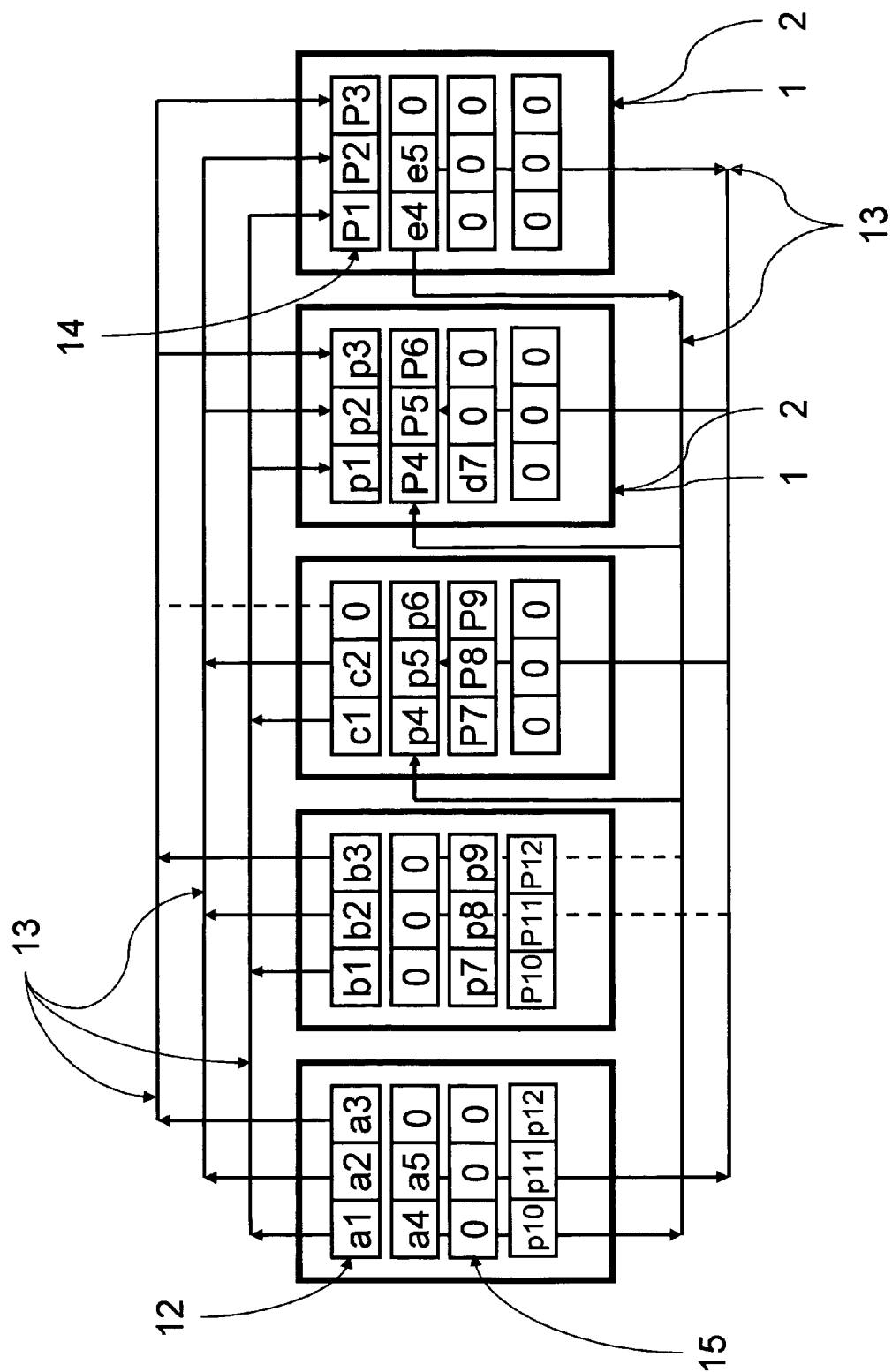
FIG. 3 illustrates another embodiment of the physical distribution of data and redundancy blocks in the system, where all nodes store data as well as redundancy information in an interleaved fashion.

FIG. 3 is another embodiment that shows an example how the blocks may be redistributed over the various nodes in the cluster system so that every node now embodies mass storage areas for data (4) and for redundancy information (5), and the associated entities (1, 2). In the embodiment of FIG. 3, there are two redundancy regions pi and Pi within each redundant blocks ensemble that provide error protection against twin failures, indicated as logical connections between the appropriate blocks (13), according to the Singleton bound. The redundancy blocks ensembles are now ai, bi, ci, pi and Pi or ai, bi, ei, pi, Pi or ai, di, ei, pi, Pi and so forth. In principle, any assignment of data and redundancy blocks within a redundancy blocks ensemble to nodes is possible, provided that no two blocks reside on the same node. The number of blocks in the redundancy block ensemble does not have to match the number of available nodes, as sketched in this example. All other aspects of the system as discussed in the context of FIG. 2 remain valid. For example, in the given scenario, each write access to data block a4 leads to a redundancy update of the redundancy blocks p4 and P4. The same redundancy blocks are updated when the data of block e4 is changed. Again all data blocks ai are stored locally on one given node and can be used for storing user data for independent and direct access on the local node. In this example, all nodes have their private and redundantly encoded data area a, b, c, d, e. They also all store appropriate redundancy information in their MSAR (5). However, the blocks of the MSAD and MSAR are preferably interlaced physically on the mass storage devices. Assuming the available physical storage space to be of equal size on all nodes, in this example, this results in each node using 60% of its physical storage for MSAD and 40% for MSAR. In the previous example, by contrast, some nodes used 100% of their physical mass storage for MSAD and others used their 100% for MSAR.

In the above scenario shown in FIG. 3, the data and redundancy information and their corresponding mass storage areas MSAD and MSAR are interlaced on the physical devices. This makes no difference with respect to the invention. Any block arrangement on a given node is possible and may be used. However, the arrangement has to be known globally in order to allow any node to determine which redundancy blocks to access in case of local write transactions.

Figure 4:
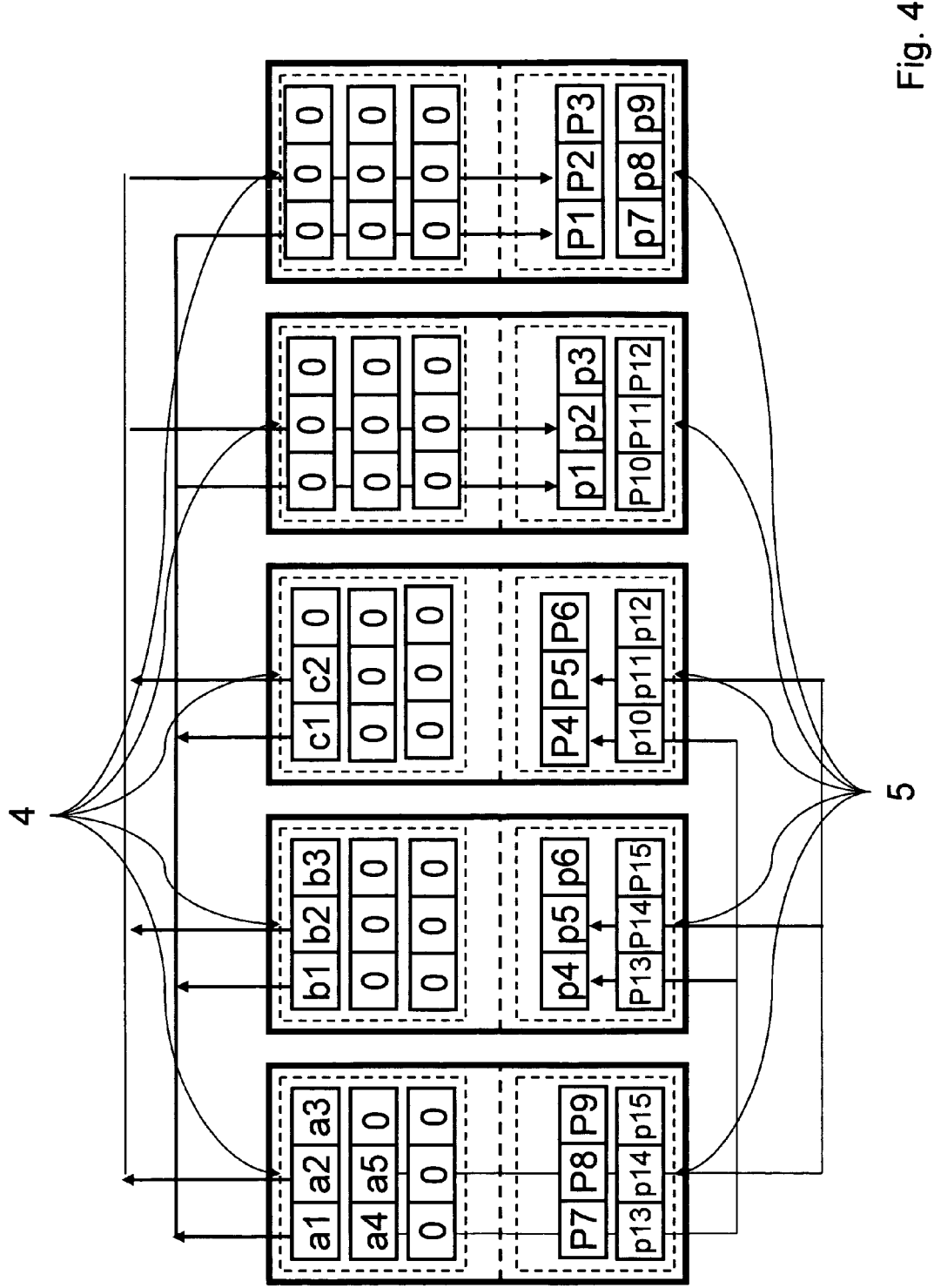
FIG. 4 shows yet another embodiment of the physical distribution of data and redundancy blocks where the nodes store data as well as redundancy information in disjoint areas.

FIG. 4 shows another example of a possible physical block distribution using a similar organization to that described for FIG. 3. Here, the user data and redundancy data may be stored adjacently in different areas of a local physical mass storage. For instance the first 60% of the local physical mass storage (for example hard drive(s)) may be used for the data blocks MSAD (4) and the remaining 40% may be used for MSAR (5). In the case where the local physical mass storage of a given node in the cluster is composed of several independent disks, the data and redundancy mass storage can be distributed to independent local devices. For example, a node may employ a 300 GB disk for data and a 100 GB disk for redundancy information, allowing completely independent operation of the local data mass storage entity (1) and the redundancy mass storage entity (2). Therefore, write transactions on remote nodes resulting in update transactions to the local redundancy area MSAR (5) would not affect at all any of the potential local accesses to the MSAD (4).

FIGS. 2, 3 and 4 represent a few examples of where the redundancy data is concentrated on dedicated nodes and the redundancy data is equally distributed over all nodes in the system. In all of these embodiments, the number of blocks in a redundant blocks ensemble match the number of nodes, all having the same physical storage capacity. However, there are many other possible ways to organize the user data and redundancy data on the local physical storage that the invention may employ. For example, the number of blocks in a redundant blocks ensemble may be smaller than the number of nodes, and the physical storage capacity of the nodes may vary. The number of data and redundancy blocks can also vary from node to node. One reason for such a variation could be the fact that some nodes may require less storage space than others and, thus, can host more redundancy blocks. Moreover, the nodes in the system may not necessarily be built from the same type of hardware, but may differ in age or quality of their components. This results in different failure probabilities. Accordingly, such non-homogeneity may also be a reason to choose a different distribution arrangement than the homogenous arrangements described above.

Figure 5:
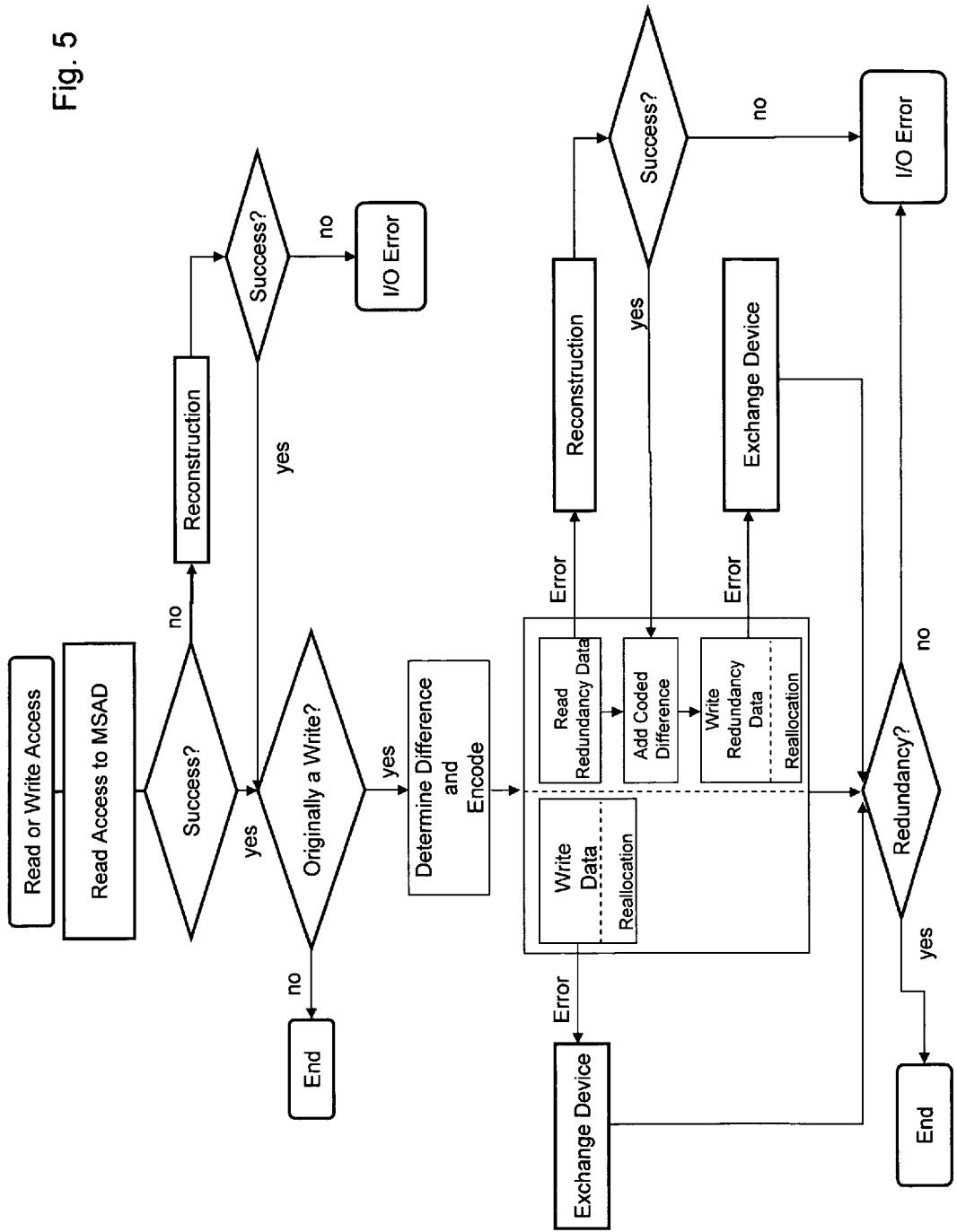
FIG. 5 is a flow chart of a process for servicing requests in the system and its behavior in the case of errors.

FIG. 5 is a process flow chart showing an example of the operation of a cluster system of the invention to read or write service requests and to error scenarios. The read-write module checks all requests for the occurrence of an error before they are handed back to the requester. The notification of an error is generated by a storage device and provided to the read-write module. Once the read-write module receives the error notification, reconstruction of the missing information is triggered for all following requests. In case of read accesses, the requested data may be reconstructed by decoding the given redundancy and user data in the redundant blocks ensemble. The redundancy decoder uses an inverse coding algorithm to that used by the encoder to compute the requested data. An example how this may be done is described, for example, by Hankerson et al. (D. R. Hankerson: Coding Theory and Cryptography: The essentials, ISBN:0824704657). After reconstruction, the requested data may be returned to the requesting application and may be stored in a reallocated area in the mass storage system. If the reallocation fails, the mass storage device has to be replaced and an appropriate error operation may be initiated by the cluster system. In the extremely unlikely case of the reconstruction failing, as for instance if the number of failing devices exceeds the redundancy limits of the algorithm, the cluster system will have to return an I/O error.

An error during a write operation is more complicated because different scenarios may occur. Since every write request is preceded by a read request, an error could happen during this initial reading of the data block. However, such read errors can be handled in the same way as discussed above. If the data cannot be reconstructed, an I/O error has to be reported back to the requester. Using the reconstructed data, the write request can be served as in any other case. If a write fails, the specific device may be marked as faulty, and should be replaced by a new one. Furthermore, errors can occur during completion of the write requests for the corresponding redundancy blocks, i.e. during the read or write of the redundancy information. Read errors for redundancy blocks can trigger the recalculation of the redundancy information from the corresponding data blocks. This can be done using the redundancy encoder (8). If the reconstruction fails, the recalculation ends with an I/O error. The reconstruction can only fail if the number of failing devices exceeds the number of errors tolerable by the chosen algorithm. It is of course also possible to mark the device as faulty immediately, without the recalculation of the redundancy information. In this scenario, the write request to this device can be tagged as failed.

If the redundancy data to be overwritten can be recalculated, the difference with respect to the new redundancy information may be determined and the result written back to the device. If the device has spare blocks, the write of the reconstructed redundancy information can succeed, but, of course, an error can also occur during this last write operation. If this happens, the device is marked faulty just as in the case of a write error for a data device above to enable it to be replaced.

The status of all pending operations can be reported back to the read-write module, which checks whether or not the new data and the corresponding redundancy data have been stored on a sufficient number of devices, and generates a defined minimum level of fault tolerance. An insufficient number of successful write operations constitutes an error.

Usually, a device is able to recognize faulty blocks and remaps them to spare blocks. Only if there are no more spare blocks left is an error reported back to the application. This remapping typically is done by the driver or the controller of the device and is transparent to applications. In FIG. 5 this remapping is introduced as Reallocation.

Since all write requests are preceded by reads in order to determine the difference between old and new data, it is suggested to relocate the computation from the read-write module to the device itself. An enhanced device controller capable of performing the read-modify-write (RMW) transaction locally on the device, for instance, can reduce the data rate between the device and its host. In this scenario, the write request would be directly forwarded to the device as a special RMW request. The device may calculate the difference. In case of a data write, it stores the new data and hands the result back to the module for further calculations. In case of a redundancy write, it applies the received update information to the local redundancy block. This approach relieves the load on the host processor, since the calculation is offloaded to the device hardware. In addition, the available bandwidth to the device is increased, since part of the computation now takes place very close to the device.

While the foregoing description of the invention has been with reference to preferred embodiments, it will be appreciated by those skilled in the art that changes to these embodiments may be made without departing from the principles and spirit of the invention, the scope of which is defined by the claims.

What is claimed is:

1. A computer system for distributed data storage, comprising:
    a plurality of independent nodes, each node formed by a computer having one or more associated local storage devices, each storage device being assigned to such computer for independent and asynchronous access;
    a network connecting said nodes;
    each said storage device having a plurality of storage areas and sub-areas for storing one or both of data and redundancy information, local data of each computer being stored entirely within the storage areas of one storage device associated with such computer at its corresponding node, and redundancy information corresponding to said local data being stored in sub-areas of other storage devices associated with other different nodes; and
    a read-write module for each of the computers, the modules providing an interface to access said storage areas of said associated storage devices while maintaining independent and asynchronous access to the local data, and providing mapping between sub-areas on said associated storage devices storing the local data and redundancy storage areas on one or more other ones of said storage devices at said other nodes storing redundancy information, the read-write modules generating and storing redundancy information for write accesses to said local data to allow reconstruction of said local data for an access failure, and initiating reconstruction of said local data for a failed access to the associated storage device.

2. A computer system according to claim 1, wherein said computers locally process read accesses to assigned local data storage areas without requiring network transactions.

3. A computer system according to claim 1, wherein said redundancy information for data reconstruction is derived from differences between data being written and data already stored, said differences being determined by a redundancy module and being stored in assigned sub-areas of the redundancy storage areas on said one or more other ones of the storage devices at said other nodes.

4. A computer system according to claim 3, wherein the redundancy module comprises an encoder that generates redundancy information for a data block to be written, and the computer system uses such redundancy information to correct previous redundancy information stored in the assigned sub-areas of the redundancy storage areas.

5. A computer system according to claim 4, wherein the redundancy module comprises a decoder that uses an inverse redundancy algorithm for reconstruction of the data in a corresponding sub-area, and stores the reconstructed data in another spare sub-area.

6. A computer system according to claim 1, further comprising virtual storage devices providing an interface to storage areas on remote nodes.

7. A computer system according to claim 1, wherein said data storage areas and assigned redundancy areas reside on different storage devices.

8. A computer system according to claim 1, wherein the storage devices provide more than one redundancy area.

9. A computer system according to claim 1, wherein at least one of said one or more associated storage devices comprises the memory of an assigned computer.

10. A method of data storage in a system comprising a plurality of independent computers having associated local storage devices forming a plurality of independent nodes interconnected by a network, said storage devices having storage areas and sub-areas for storing one or both of data and redundancy information, and each storage device being assigned to an associated computer for independent and asynchronous access, comprising:
    assigning storage areas of a first storage device at a first node to an associated first computer at the first node for storing first local data of the first computer entirely within said storage areas of said first storage device;
    assigning sub-areas of one or more storage devices at the first node as redundancy storage areas for storing redundancy information of second local data of one or more second computers at one or more other second nodes;
    generating redundancy information for write accesses of the first local data at said first storage device and storing said redundancy information in said redundancy storage areas of one or more storage devices at said one or more other second nodes to enable reconstruction of said first local data; and
    upon an access failure to said first local data at said first node, initiating data reconstruction using said redundancy information for said first local data from said one or more storage devices at said one or more other second nodes.

11. A method for data storage as recited in claim 10 further comprising processing locally read requests to local storage areas without requiring remote data exchange.

12. A method for data storage as recited in claim 10 further comprising reconstructing data of faulty storage devices using said redundancy information.

13. A method for data storage as recited in claim 12, wherein said reconstructing comprises generating said redundancy information by a redundancy encoder implemented in hardware and software.

14. A method for data storage as recited in claim 10 further comprising interfacing to remote storage areas using virtual storage devices associated with said nodes.

15. A method for data storage as recited in claim 10, wherein said assigning storage areas for data and for redundancy information comprises allocating a first group of sub-areas of said storage areas on each node for data storage, and allocating a second group of sub-areas on such nodes for redundancy information, and wherein certain sub-sets of the redundancy sub-areas are allocated so as to be associated with multiple data sub-areas such that all redundancy sub-areas of the sub-set are updated with redundancy information for an accesses to any one of the associated data sub-areas.

16. A method for data storage as recited in claim 15, wherein said distributing storage areas comprises interlacing the data and redundancy storage areas across said storage devices on different nodes.

17. A method for data storage as recited in claim 10, wherein the number of redundancy sub-areas is different from the number of nodes, and the method further comprises mapping the redundancy sub areas to associated data storage sub-areas.

* * * * *